Oct. 13, 1964  E. M. O'CONOR HONEY ETAL  3,152,363
APPARATUS FOR THE PRODUCTION OF SINTERED
POROUS RIBBED PLASTIC SHEETING
Filed March 22, 1962  2 Sheets-Sheet 1

United States Patent Office 3,152,363
Patented Oct. 13, 1964

3,152,363
APPARATUS FOR THE PRODUCTION OF SIN-
TERED POROUS RIBBED PLASTIC SHEETING
Eric Maurice O'Conor Honey, Chigwell, Charles Rupert
Hardy, London, and Joseph Clegg, Hornchurch, England, assignors to Pritchett & Gold and E.P.S. Company Limited, Dagenham Dock, Essex, England, a British company
Filed Mar. 22, 1962, Ser. No. 181,746
Claims priority, application Great Britain Mar. 27, 1961
3 Claims. (Cl. 18—15)

This invention relates to plastic sheeting of sintered thermoplastic polymer powders, and is more particularly concerned with means for producing a profiled form on such sheeting, as in the case, for example, of ribbed microporous sheets for use as separators in electric storage batteries.

The invention is concerned with apparatus of the type which includes a hopper for delivering a continuous layer of powder to a travelling belt for subsquent sintering by heat treatment, and a die located above the belt for controlling the thickness of the powder layer to be sintered, the said die having its operative lower surface slotted to correspond with the desired shape and spacing of the ribs or the like to be formed on the powder layer.

In the production of storage battery separators having inverted V-shaped ribs, the lower surface of the die is provided with corresponding inverted V-shaped slots. The width and height of such ribs may vary considerably between separators for different types of battery, and it will be appreciated that, in the case for example of sharp narrow ribs or relatively tall ribs, the effect of drag between the sides of the slots and the powder can result in the rib formation being rough and uneven. This problem is further aggravated by the fact that the flow properties of powders vary considerably between different grades. For example, in order to achieve a very fine pore size in the final sintered product, one might wish to use a very fine powder having an average particle size of the order of 35 microns. Furthermore, as is well known, diluents or additives such as wood flour are sometimes added to the thermoplastic polymer powder. Such fine powders and powder mixtures have poor flow properties making it difficult to achieve satisfactory rib formation whatever the dimensions and form of the ribs.

The object of the present invention is to provide means for use in conjunction with apparatus of the above type for the continuous formation of a ribbed form on the powder layer which will ensure the ribs being smooth sided and even, and which also enables powders to be used which hitherto have been found unsatisfactory because of their poor flow properties. A further object of the invention is to provide means as aforesaid which will not affect or reduce any desired degree of porosity in the final sintered material.

In accordance with the invention, the said means comprise a plurality of separate unattached balls distributed across the belt in the path of the powder layer along one face of the slotted die at the side thereof adjacent the hopper, means also being provided for maintaining each of the balls loosely positioned in relation to the slots in the die with the balls otherwise resting freely on the belt and/or the powder thereon, the said balls being capable of rotating and any such rotation being effected solely by contact between each ball and the travelling belt and/or the powder thereon.

Preferably the said balls are of polished steel. The positioning means therefor may comprise a series of pins projecting from the face of the die, the said pins maintaining a desired spacing between the balls and the die face, and also loosely locating the balls on lines passing midway between pairs of adjacent slots in the die, such that the balls are spaced from each other with the slots substantially unobstructed.

Preferably the balls are of a diameter which is less than the lateral spacing or pitch of the slots in the die and which is greater than the height above the belt of the tops of the slots. Their diameter may be at least twice that height, depending upon the said lateral spacing or pitch of the slots.

A preferred embodiment of the invention will now be described by way of example, in connection with the production of microporous separators for use in electric storage batteries. In the accompanying drawings.

Figure 1:
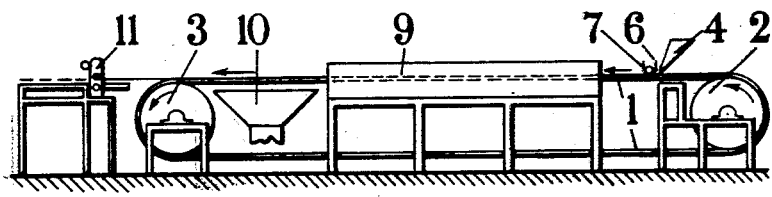
FIGURE 1 is a general elevation of a plant for producing sheets of microporous thermoplastic material for use in producing separators for electric accumulators.

A conveyor for the thermoplastic polymer powder, for example polyvinyl chloride powder or high density polyethylene powder of particle size up to 150 microns, comprises a stainless steel belt 1 passing around two pulleys 2, 3 with the upper run of the belt supported by lateral bars (not shown) over which the belt slides. At one end of the plate a supply hopper 4 for the powder is supported above the belt and is adapted to discharge a layer or "blanket" of powder 5 across the full width thereof. Beyond the hopper an adjustable gate 6, extending across the belt, controls the issue of powder from the hopper and ensures that the blanket of powder is of substantially even thickness. Beyond the said gate a die 7 having its lower edge formed with slots 8 (see FIGURES 3 and 4) is provided for imparting the desired ribbed form 5a to the powder layer.

The belt with the profiled layer of powder thereon then travels through a sintering oven 9 from which the sintered material emerges and is cooled by air issuing from a duct 10 prior to being stripped from the belt. The sintered material is then fed to a guillotine 11 where it is cut up to the size required for battery separators.

Care is taken to ensure that no vibration is transmitted to the belt during the powder laying, rib forming and sintering operations. This fact, coupled with the absence of any pressure on the powder and the chosen particle size thereof, ensures a high level of microporosity in the final sintered material.

In accordance with the invention, a plurality of separate unattached balls 12 is distributed along the face of the slotted die 7 to rest on the belt 1 at the side of the die adjacent the hopper 4. In the present embodiment, these balls are so located and distributed that each ball is spaced slightly from the face of the die 7 and lies in front thereof on a line passing midway between a pair of adjacent slots.

In order to maintain the location and distribution of the individual balls 12 in relation to the slots 8 in the die plate 7 and to each other, two rows of locating pins 13, 14 are provided projecting from the face of the die 7.

When using a profiling die with the pitch of the slots being of the order of .475–.525″ and the height of the tops of the slots above the belt being of the order of .150–.210″, we use steel balls 7/16″ in diameter and steel pins 1/16" in diameter to provide the locating means therefor.

The pins 13 project 3/16" from the face of the die. They are distributed each midway between pairs of adjacent slots 8 at a level just above that of the tops of the slots whereby the pins 13 are at a height substantially level with the centres of the balls 12 when the latter are at rest on the belt 1.

The pins 14 of the other row project 3/4" from the face of the die 7. They are distributed each directly above a slot 8 and at a level between that of the row of pins 13 and that corresponding to the tops of the balls 12.

In operation, the movement of the belt 1 and the layer of powder 5 thereon urges the balls 12 towards the die 7 and the second row of pins 14 effectively traps the individual balls on lines passing midway between pairs of adjacent slots 8 while the row of pins 13 maintains the desired spacing between the balls and the face of the die. The exact height of the second row of pins 14 is chosen such that the balls are spaced from each other, while allowing sufficient clearance between each individual ball and the pins to allow the balls to be capable of rotating freely. This second row of pins also effectively prevents any substantial lateral or upward displacement of the balls.

In the above arrangement, the height of the balls 12 is rather more than twice the height of the tops of the slots 8 above the belt, while laterally each ball occupies a distance slightly less than the pitch of the slots. It will be appreciated that the size of the balls 12 and the exact heights of the two rows of pins 13, 14 will be variable depending on the design of the profiling die 7 and, in particular, on the relationship between the height and pitch of the slots 8 thereof.

It is an important feature of the invention that the balls 12 are only loosely retained in position by the locating pins 13, 14 and that any rotation of each ball is effected solely by its contact with the travelling belt and/or the powder thereon.

In operation, the plurality of balls 12 lie in the path of the blanket of powder as it travels along on the belt 1 from the hopper 4 and gate 6 towards the die 7. Thus, the blanket of powder is impeded by the balls so that it is broken up and forced to flow all around and over them. As can easily be seen in practice, instead of a stationary layer of powder (relative that is to the belt) arriving at the die and being profiled by reason only of some parts of the layer being allowed to pass and some being obstructed, the blanket of powder is in contrast in a state of motion (relative to the belt) flowing as it is around and up and over the balls. By virtue of their positioning and size in relation to the slots, the balls also tend to feed or channel the powder towards these slots. Thus ample powder is assured at the slots for the formation of full and regularly shaped ribs, while at the same time the channelled and concentrated feed of powder at the slots considerably reduces the effect of drag as the powder passes through.

Figure 3:
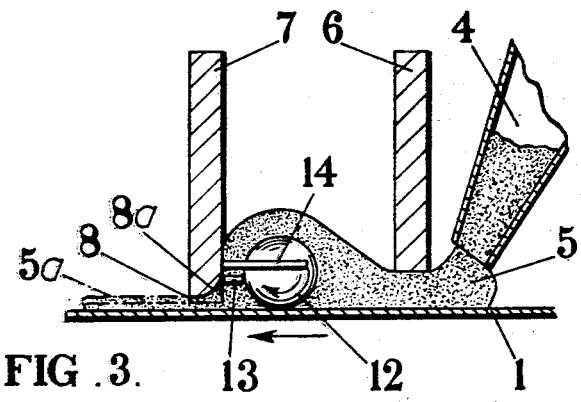
FIGURE 3 is an enlarged detailed view showing the hopper and one of the balls which ensure the free distribution of the powder on the belt, the powder passing below the die plate which produces ribs on the sheet of powder.
Figure 4:
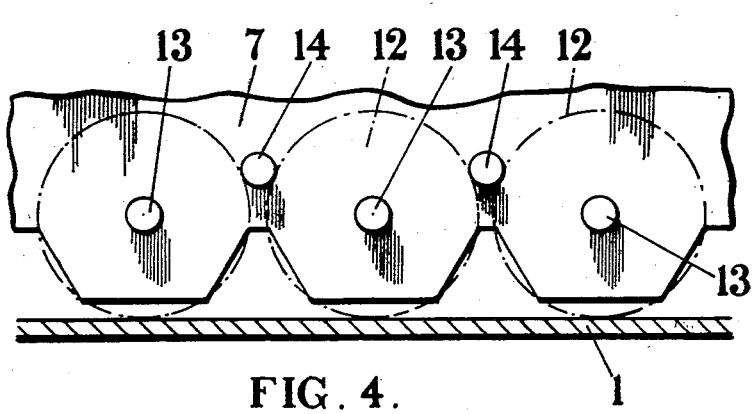
FIGURE 4 is a front view of a die plate showing the arrangement of the balls and locating pins which spread out the powder on the travelling belt. This figure is drawn to a larger scale than the remaining figures.
Figure 2:
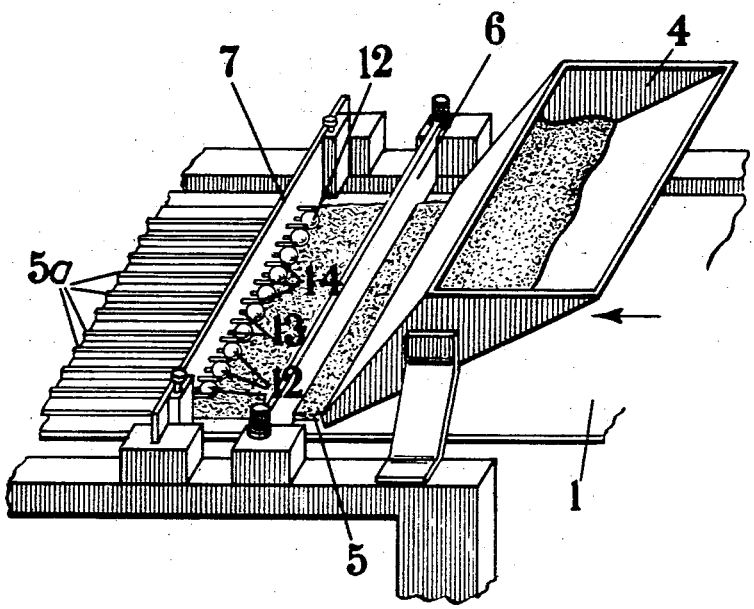
FIGURE 2 is a view showing the hopper and powder distributor means arranged over the belt by which the powder is carried forward through the die plate to produce ribs thereon.

As seen in FIGURE 3 the tops of the slots are cutaway as at 8a to form downwardly curving lead-in edges. The faces of these cut-away portions are highly polished to assist in providing a smooth entry into the slots for the channelled feed of powder.

The ability of the balls to rotate freely in any direction, as caused by their contact with the travelling belt and/or the powder thereon, also assists considerably in keeping the powder moving and flowing freely into the slotted portions of the die. There is little or no compacting pressure anywhere which could affect the final porosity of the sintered material.

In practice we have found that the provision of such freely rotatable balls enables a much wider range of rib formations and sizes to be satisfactorily produced by the profiling die method than hitherto, that is by ensuring the formation of even and smooth-sided ribs. The arrangement is simple, is complete in itself in that no separate or external driving or agitating means are required, and adds little to the cost of the basic plant. Furthermore it enables powders to be used of grades and particle sizes which hitherto have been found quite unsuitable when using a profiling die by reason of their poor flow properties.

In connection with the manufacture of separators for electric storage batteries, it is often the practice to admix diluents or other additives, such as wood flour, with the thermoplastic polymer powder and these can seriously impair the flow properties of a chosen powder. The present invention is found to nullify the drawbacks occasioned by the use of such admixed materials.

What is claimed is:
1. Apparatus for use in the production of plastic sheeting from sintered thermoplastic polymer powders comprising a hopper for delivering a continuous layer of the powder on to a travelling belt for subsequent sintering by heat treatment, and a die plate located above the belt for controlling the thickness of the said powder layer, the operative lower surface of the die plate being slotted to correspond with the desired shape and spacing of the ribs to be formed on the powder layer, a plurality of separate unattached balls distributed in a spaced row across the belt in the path of the powder layer travelling to the slots in the die plate, and means for spacing the balls from the die plate and from one another, positioning them between the discharge outlet of said hopper and the die plate and also positioning them in relation to the slots in the die plate, the balls being capable of rotating freely solely by contact with the belt and any powder thereon.

2. Apparatus as claimed in claim 1, in which each ball is located by a pin projecting toward said hopper from the face of the die plate at a height level with the centre of the ball when the latter is at rest on the belt and by two pins also projecting toward said hopper from the face of the die plate one at each side of the ball, at a level between that of the pin before referred to and the top of the ball, the two pins allowing clearance so that the ball can rotate freely.

3. Apparatus as claimed in claim 2, in which the two pins of such claim locate the ball on a line passing midway between a pair of adjacent slots in the lower surface of the die plate.

References Cited in the file of this patent
UNITED STATES PATENTS

| | | |
|---|---|---|
| 2,614,757 | O'Farrell | Oct. 21, 1952 |
| 2,899,704 | Pekarek | Aug. 18, 1959 |
| 2,948,043 | Gory | Aug. 9, 1960 |